(12) United States Patent
Yoshikawa et al.

(10) Patent No.: US 6,504,639 B1
(45) Date of Patent: Jan. 7, 2003

(54) OPTICAL SCANNER

(75) Inventors: Motonobu Yoshikawa, Osaka (JP); Yoshiharu Yamamoto, Osaka (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/831,976

(22) PCT Filed: Sep. 21, 2000

(86) PCT No.: PCT/JP00/06483

§ 371 (c)(1),
(2), (4) Date: May 15, 2001

(87) PCT Pub. No.: WO01/23942

PCT Pub. Date: Apr. 5, 2001

(30) Foreign Application Priority Data

Sep. 29, 1999 (JP) .......................................... 11-276042

(51) Int. Cl.[7] ............................................. G02B 26/08
(52) U.S. Cl. ........................ 359/208; 359/205; 359/216; 347/232
(58) Field of Search ................................. 359/204, 205, 359/206, 207, 208, 212, 216, 217, 218, 219; 347/232

(56) References Cited

U.S. PATENT DOCUMENTS

| | | | |
|---|---|---|---|
| 4,629,283 A | 12/1986 | Plaot | |
| 4,690,485 A | 9/1987 | Plaot | |
| 4,912,321 A | 3/1990 | Cooper | |
| 4,941,719 A | 7/1990 | Hisada et al. | |
| 5,013,108 A | 5/1991 | Van Amstel | |
| 5,220,449 A | 6/1993 | Kuroda | |
| 5,353,047 A | 10/1994 | Nakamura et al. | |
| 5,373,390 A | 12/1994 | Sakuma | |
| 5,408,095 A | 4/1995 | Atsuumi et al. | |
| 5,648,865 A | * 7/1997 | Iizuka | ........................ 347/256 |
| 5,715,078 A | * 2/1998 | Shiraishi | ...................... 347/244 |
| 5,751,464 A | 5/1998 | Yoshikawa et al. | |
| 5,801,869 A | 9/1998 | Yoshikawa et al. | |
| 6,091,533 A | 7/2000 | Iizuka | |

FOREIGN PATENT DOCUMENTS

| | | |
|---|---|---|
| JP | 60-257417 | 12/1985 |
| JP | 60-257418 | 12/1985 |
| JP | 62-502428 | 9/1987 |
| JP | 4-245214 | 9/1992 |
| JP | 7-110611 | 4/1995 |
| JP | 11-30710 | 2/1999 |
| JP | 11-153764 | 6/1999 |
| WO | WO 82/02955 | 9/1982 |
| WO | WO 86/05940 | 10/1986 |

* cited by examiner

*Primary Examiner*—Cassandra Spyrou
*Assistant Examiner*—Euncha Cherry
(74) *Attorney, Agent, or Firm*—Merchant & Gould P.C.

(57) ABSTRACT

An optical scanner having excellent optical performance and guiding a light beam from one curved mirror directly to a photoconductive drum without requiring a reflecting mirror. The optical scanner includes: a light source unit (1); an optical deflector (5) for deflecting a light beam from the light source unit so as to cause scanning; a first image formation optical system (2, 3) for forming a line image on a deflection surface of the optical deflector, which is disposed between the light source unit and the optical deflector; and a second image formation optical system (7) composed of one curved mirror, which is disposed between the optical deflector and a surface (8) to be scanned. A light beam from the first image formation optical system is incident obliquely on a plane that is parallel to a main scanning direction and contains a line normal to the deflection surface of the optical deflector, and a light beam from the optical deflector is incident obliquely on a plane (hereinafter referred to as a "YZ plane") that is parallel to the main scanning direction and contains a line normal to a vertex of the curved mirror. A conditional formula of $10<\theta M<35$ is satisfied, wherein $\theta M$ indicates an angle in degrees between the YZ plane and a central axis of a light beam traveling toward the curved mirror.

25 Claims, 13 Drawing Sheets

— Main Scanning Direction
--- Sub Scanning Direction

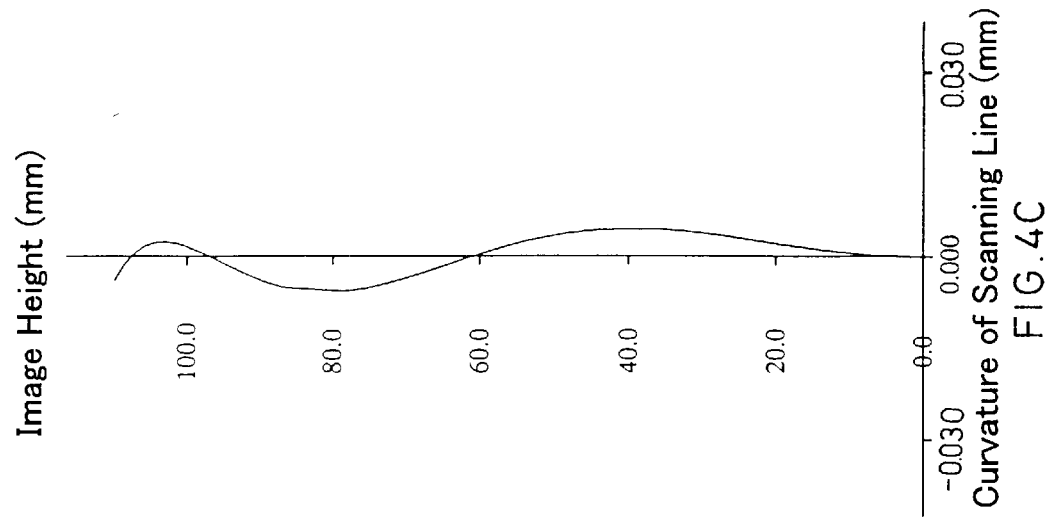
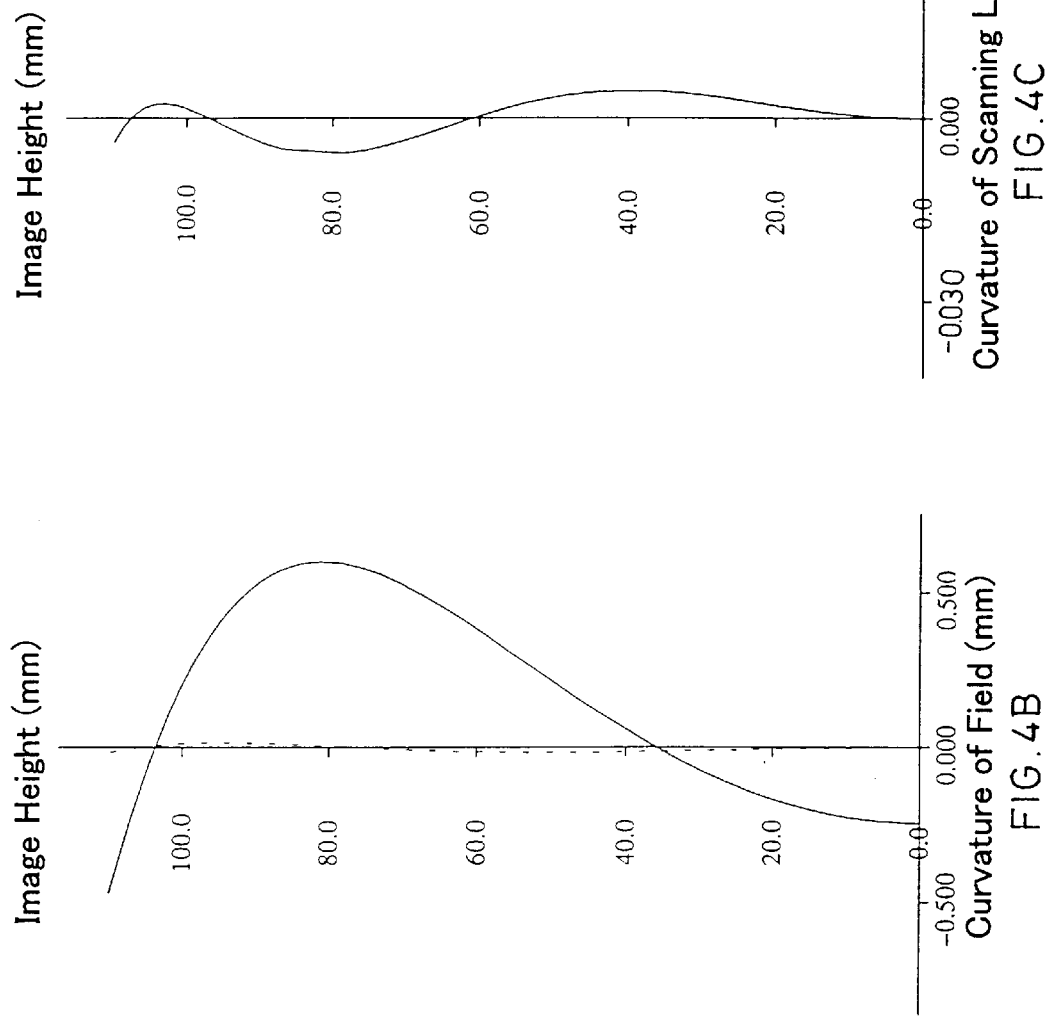
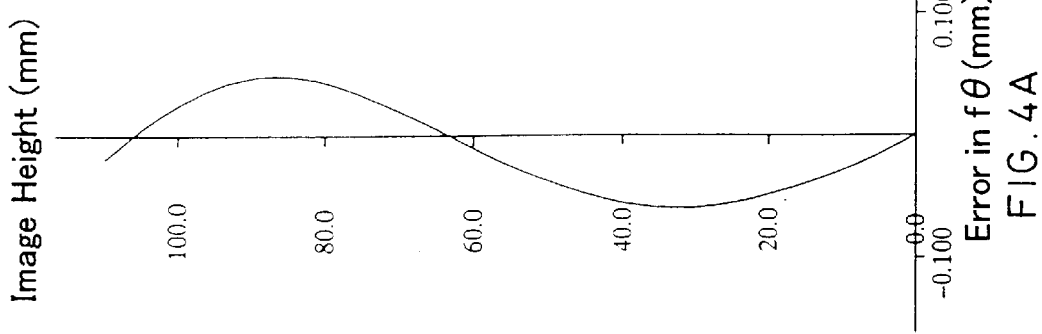
FIG. 4A  
FIG. 4B  
FIG. 4C

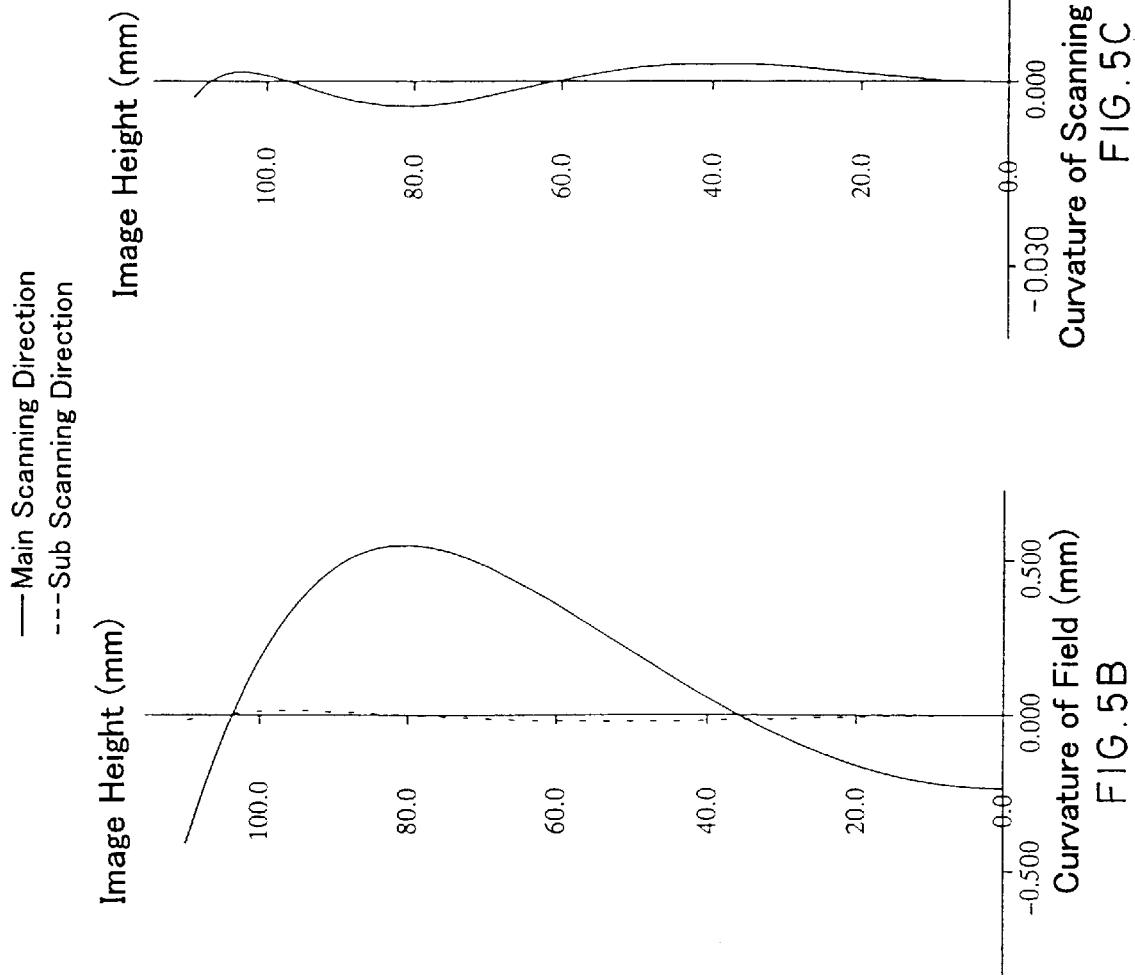
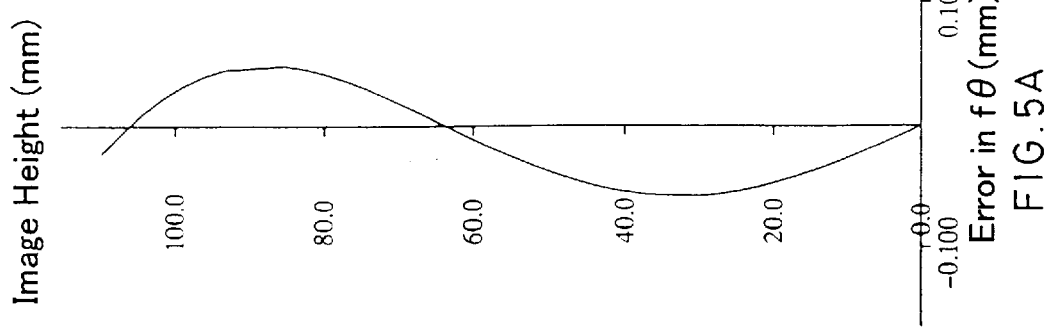
FIG. 5A  FIG. 5B  FIG. 5C

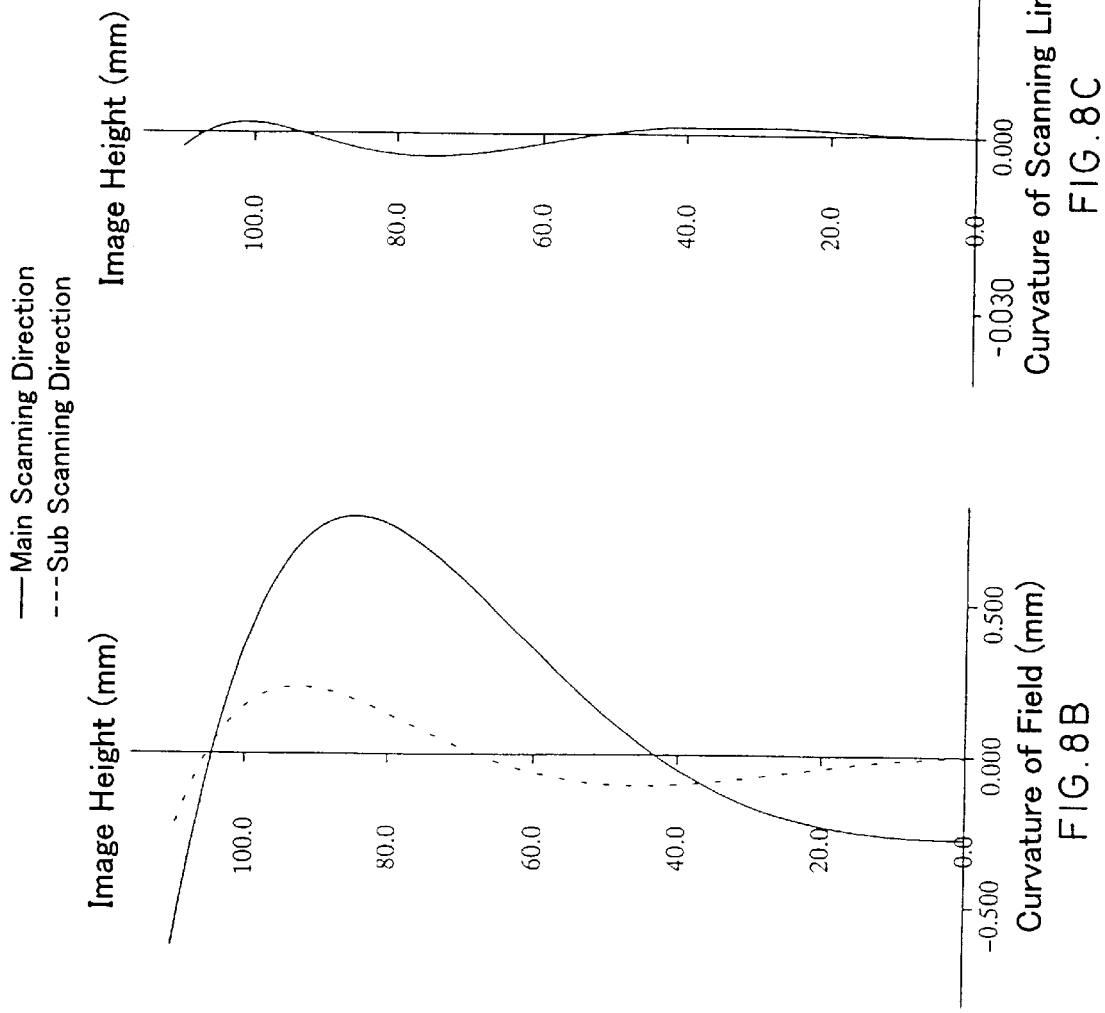
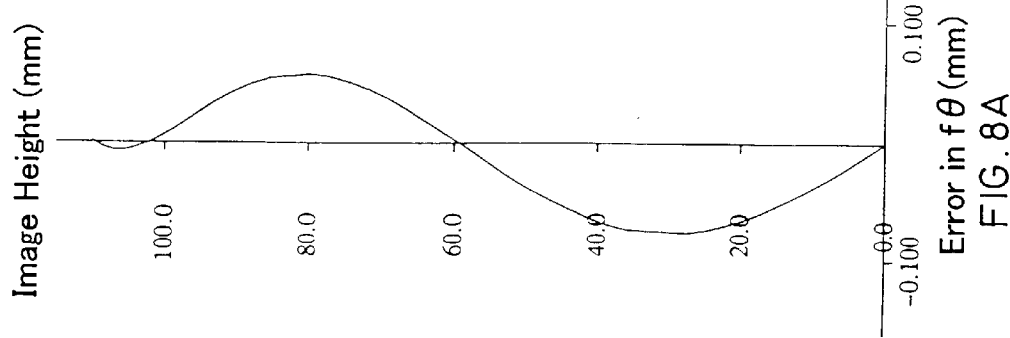

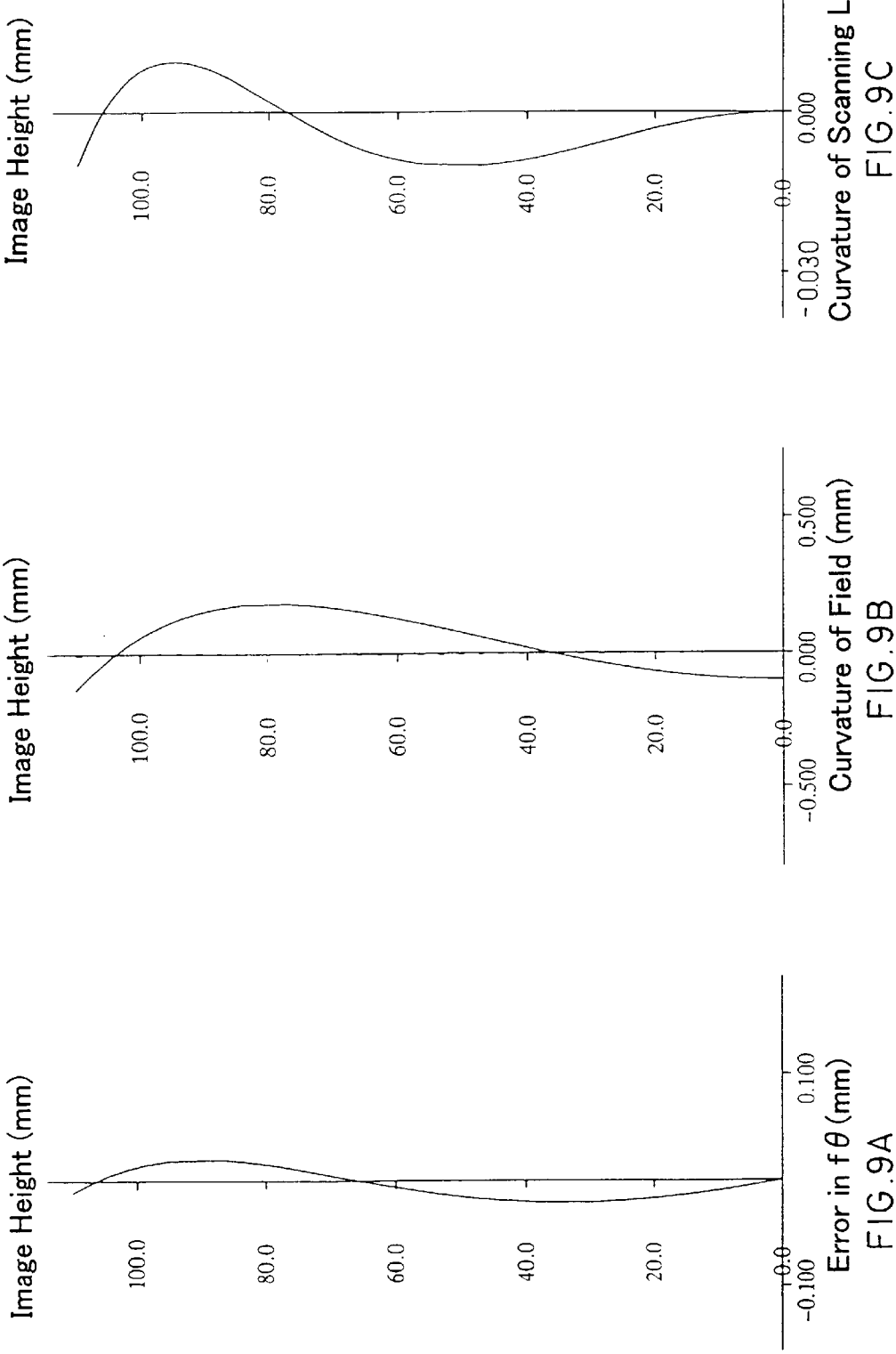

OPTICAL SCANNER

TECHNICAL FIELD

The present invention relates to an optical scanner used in a laser beam printer, a laser facsimile, a digital copier, or the like.

BACKGROUND ART

Many of optical scanners used in laser beam printers and the like each include a semiconductor laser as a light source, a first image formation optical system for linearly focusing a light beam from the light source on an optical deflector to compensate for the tilt of a deflection surface of the optical deflector, a polygon mirror as the optical deflector, and a second image formation optical system for forming uniform spots on a surface to be scanned at a constant speed.

A second image formation optical system in a conventional optical scanner includes a plurality of large glass lenses called an "fθ lens" and hence, had problems of difficulty in size reduction and of high cost. In order to achieve reductions in size and cost, an optical scanner as described in JP 11-30710 A has been proposed that includes one curved mirror used as a second image formation optical system.

Schematically, it is described that a light beam from the curved mirror is guided directly to an image surface in the above-mentioned optical scanner. In the optical scanner, however, the reflection angle of a light beam reflected by the curved mirror is small and accordingly, it has been necessary to dispose a reflecting mirror between the curved mirror and a photoconductive drum to actually guide a light beam to the photoconductive drum. In addition, since a cross-sectional shape in a sub scanning direction of the curved mirror described in JP 11-30710 A is not a circular arc shape but a quadratic polynomial shape, processing and measurement of the curved mirror are difficult.

JP 11-153764 A discloses an optical scanner including a second image formation optical system composed of one curved mirror alone without requiring a reflecting mirror. However, suitable conditions for guiding a light beam directly to a surface to be scanned have not been clear. In addition, it is necessary to allow a light beam to be incident obliquely on the curved mirror at a large angle therebetween to guide the light beam directly to the surface to be scanned, but this causes a considerable beam aberration at the mirror plane. However, there has been no sufficient countermeasure to such a considerable beam aberration.

DISCLOSURE OF INVENTION

In view of the above-mentioned problems, the present invention is intended to provide an optical scanner having excellent optical performance, guiding a light beam from one curved mirror directly to a photoconductive drum without requiring a reflecting mirror, and allowing the curved mirror to have a shape permitting relatively easy processing and measurement.

An optical scanner according to a basic configuration of the present invention includes: a light source unit for emitting a light beam; an optical deflector for deflecting the light beam from the light source unit so as to cause scanning; a first image formation optical system for forming a line image on a deflection surface of the optical deflector; and a second image formation optical system composed of one curved mirror. The first image formation optical system is disposed between the light source unit and the optical deflector. The second image formation optical system is disposed between the optical deflector and a surface to be scanned. A light beam from the first image formation optical system is incident obliquely on a plane that is parallel to a main scanning direction and contains a line normal to the deflection surface of the optical deflector. A light beam from the optical deflector is incident obliquely on a plane (hereinafter referred to as a "YZ plane") that is parallel to the main scanning direction and contains a line normal to a vertex of the curved mirror. In addition, a conditional formula of $10<\theta M<35$ is satisfied, wherein $\theta M$ indicates an angle in degrees between the YZ plane and a central axis of a light beam traveling toward the curved mirror from the optical deflector.

According to this configuration, the second image formation optical system is composed of one mirror and reflects a light beam at a large reflection angle satisfying a relationship of $10<\theta M$. Hence, the degree of freedom in arrangement increases, no reflecting mirror is required, and a light beam can be guided directly to the surface to be scanned. The upper limit of the above-mentioned conditional formula defines a range in which beam aberration can be compensated.

In the above-mentioned configuration, a light beam is incident obliquely on the curved mirror at a large angle satisfying the relationship of $10<\theta M$. This causes a large beam aberration at a mirror plane. In order to compensate for this aberration, in the optical scanner of the present invention, a light beam from the first image formation optical system is allowed to be incident obliquely on a plane that is parallel to the main scanning direction and contains the line normal to the deflection surface of the optical deflector, and the tilt angle of the light beam is limited in a range in which the beam aberration can be compensated.

In order to obtain an excellent spot in the above-mentioned configuration, in a cross section in a sub scanning direction, an angle made by a light beam reflected by the curved mirror with respect to an incident light beam from the deflection surface is set to be negative when a direction of an angle made by a reflected light beam reflected by the deflection surface with respect to an incident light beam from the first image formation optical system is regarded as positive. With this configuration, the reflected light beam and the incident light beam are positioned in the positive and negative directions, respectively. Hence, the beam aberration caused by the oblique incidence is compensated and thus an excellent spot can be obtained.

In order to obtain a more excellent spot, in the above-mentioned configuration, the following conditional formula (1) is allowed to be satisfied:

$$1.6<\theta M/\theta P+0.98L/(L+D)<2.2 \qquad (1),$$

wherein $\theta P$ indicates an angle in degrees between the line normal to the deflection surface and the light beam from the first image formation optical system, L a distance from the deflection surface to the vertex of the curved mirror, and D a distance from the curved mirror to the surface to be scanned.

When the positional relationship among the first image formation optical system, the optical deflector, and the second image formation optical system satisfies the above-mentioned conditional formula, the beam aberration caused by the oblique incidence of a light beam can be compensated suitably. The aberration is caused in an oblique direction when the conditional formula is not satisfied.

In order to achieve a higher resolution, it is desirable that the following conditional formulae (2) and (3) are satisfied:

$$1.86 < \theta M/\theta P + 0.98 L/(L+D) < 1.94 \quad (2);$$

and $$0.48 < L/(L+D) < 0.75 \quad (3).$$

When the conditional formula (2) is satisfied, the beam aberration caused by the oblique incidence of a light beam can be compensated further suitably. When the conditional formula (3) is satisfied, the beam aberration can be compensated even at a reflection angle satisfying the relationship of $10 < \theta M$. When the lower limit is not satisfied, the beam aberration occurs. On the contrary, when the upper limit is not satisfied, a beam diameter in the sub scanning direction considerably varies between the scanning center and periphery. In such cases, it is difficult to obtain a high resolution.

In the optical scanner with the above-mentioned basic configuration, the curved mirror has a cross section with a circular arc shape in the sub scanning direction. With this configuration, the curved mirror is allowed to have a shape permitting relatively easy processing and measurement.

It can be considered to allow the curved mirror to have a shape with different radii of main and sub curvature, which permits compensation for the curvature of field, an error in fθ, and curvature of a scanning line, and in addition, to allow the curved mirror to have a freely curved plane with skew lines normal to a generator at respective points thereon.

In other words, it is preferable that the curved mirror has a shape for compensating the curvature of the scanning line caused by oblique incidence. In addition, the curved mirror may be asymmetrical with respect to the YZ plane. Furthermore, the curved mirror can have a skew shape in which a line normal to each point other than a vertex of a curved line (hereinafter referred to as a "generator") on which the YZ plane and a curved plane of the curved mirror intersect is not contained in the YZ plane. With such configurations, the optical system is allowed to have a simple configuration, and the curvature of the scanning line can be compensated while the beam aberration caused by oblique incidence of a light beam is compensated.

In the curved mirror with the skew shape, preferably, an angle in degrees between the YZ plane and the line normal to each point on the generator is set to increase with distance from the vertex. Furthermore, in the curved mirror with the skew shape, preferably, a direction of an angle made by the line normal to each point on the generator with respect to the YZ plane is set to be positive when an angle made by a light beam reflected from the curved mirror with respect to an incident light beam from the deflection surface is regarded as positive.

In the optical scanner with the above-mentioned basic configuration, preferably, the curved mirror is an anamorphic mirror with different radii of curvature in the main and sub scanning directions at the vertex. The curved mirror can have a mirror plane with concave shapes both in the main and sub scanning directions. In addition, the curved mirror can have a mirror plane whose refracting power in the sub scanning direction varies between the center and periphery in the main scanning direction. Furthermore, the curved mirror can have a cross section in the sub scanning direction whose radius of curvature does not depend on its cross-sectional shape in the main scanning direction.

In the optical scanner with the above-mentioned basic configuration, the first image formation optical system can be configured so as to convert the light beam from the light source unit into a convergent light beam with respect to the main scanning direction.

The above-mentioned configurations allow excellent performance to be obtained with respect to the curvature of fields in the main and sub scanning directions and the fθ characteristic.

In the optical scanner with the above-mentioned basic configuration, the light source unit also can include a wavelength variable light source and a wavelength controller. According to this configuration, since the size of a spot is substantially proportional to a wavelength to be used, control of the wavelength allows the size of a spot formed on the photoconductive drum to be controlled freely. In addition, since the second image formation optical system is composed of the reflecting mirror alone, no chromatic aberration occurs and thus it is possible to change the resolution freely without deteriorating the other performances such as the fθ characteristic.

An optical scanner according to another basic configuration of the present invention includes: a light source unit for emitting a light beam; an optical deflector for deflecting the light beam from the light source unit so as to cause scanning; a first image formation optical system for forming a line image on a deflection surface of the optical deflector; and a second image formation optical system composed of one curved mirror. The first image formation optical system is disposed between the light source unit and the optical deflector. The second image formation optical system is disposed between the optical deflector and a surface to be scanned. A light beam from the first image formation optical system is incident obliquely on a plane that is parallel to a main scanning direction and contains a line normal to the deflection surface of the optical deflector, and a light beam from the optical deflector is incident obliquely on a plane (hereinafter referred to as a "YZ plane") that is parallel to the main scanning direction and contains a line normal to a vertex of the curved mirror. In addition, the light source unit includes at least two light sources, a light mixing member is provided for mixing light beams from the at least two light sources and is disposed between the light source unit and the optical deflector, and a conditional formula of $10 < \theta M < 35$ is satisfied, wherein θM indicates an angle in degrees between the YZ plane and a central axis of a light beam traveling toward the curved mirror.

According to this configuration, since at least two light beams can be scanned in one-time scanning, at least twice as much line image data can be scanned as in the case of using one light source on the surface to be scanned. In addition, since the second image formation optical system is composed of one mirror and a light beam is reflected at a large reflection angle satisfying the relationship of $10 < \theta M$, the degree of freedom in arrangement increases and thus a light beam can be guided directly to the surface to be scanned without requiring a reflecting mirror.

For example, a dichroic mirror can be used as the light mixing member. The dichroic mirror reflects and transmits light selectively through wavelength selection and thus can mix lights efficiently. Furthermore, a half mirror also can be used. The half mirror can be processed easily and thus can mix lights at low cost.

The optical scanner with the above-mentioned configuration can be provided with a light separating member for separating a light beam present between the optical deflector and the surface to be scanned. When the light separating member for separating a light beam is disposed between the optical deflector and the surface to be scanned, at least two line images can be formed simultaneously on the surface to be scanned by one-time scanning. Accordingly, an effect can be obtained that a rate of image formation or image reading can be at least doubled.

It is preferable that for instance, a diffraction grating or a dichroic mirror is used as the light separating member. With the diffraction grating, an incident light beam is diffracted at a diffraction angle varying depending on the wavelength, and thus light can be separated efficiently at low cost. With the dichroic mirror, it reflects or transmits light through wavelength selection, and thus light can be separated efficiently.

In the optical scanner with the above-mentioned configuration, it also is possible to allow the light beams emitted from the at least two light sources included in the light source unit to have different wavelengths. Even if lights with different wavelengths are used, chromatic aberration, which occurs generally, does not occur at all, since the second image formation optical system is composed of the reflecting mirror alone. Consequently, it is possible to achieve color image formation or color image reading with a high resolution.

When an image reader or an image forming apparatus is configured using an optical scanner with any one of the above-mentioned configurations, a small high-speed and high-resolution image reader or image forming apparatus can be obtained at low cost.

A color image forming apparatus includes a conveying member, a transfer member, and an optical scanner. In the conveying member, a plurality of image forming units corresponding to a plurality of colors are assembled in a substantially cylindrical form. Each of the image forming units includes a developing unit and a photoconductor. The respective image forming units are maintained to be arranged circumferentially in the substantially cylindrical form. The conveying member simultaneously rotates the plurality of image forming units around a central axis of the substantially cylindrical form to move each of the respective image forming units between an image formation position and a stand-by position. The transfer member has a transfer body that can come into contact with the photoconductor of an image forming unit positioned at the image formation position, sequentially transfers toner images of respective colors formed on the respective photoconductors onto the transfer body as the image forming unit at the image formation position is changed successively, and superimposes the toner images of the respective colors to form a color toner image on the transfer body. The optical scanner has any one of the above-mentioned configurations and exposes the photoconductor of each image forming unit to light.

According to this configuration, optimization of the arrangement of the curved mirror and the angle of reflection of a light beam allows a small color image forming apparatus to be obtained at low cost.

In the color image forming apparatus with the above-mentioned configuration, the curved mirror of the second image formation optical system in the optical scanner can be disposed in the vicinity of the central axis of the cylindrical form.

Moreover, in the color image forming apparatus with the above-mentioned configuration, it is preferable that the optical scanner is configured to achieve the following: a light beam from the first image formation optical system is incident obliquely on a plane that is parallel to the main scanning direction and contains a line normal to the deflection surface of the optical deflector, a light beam from the optical deflector is incident obliquely on a plane (a YZ plane) that is parallel to the main scanning direction and contains a line normal to the vertex of the curved mirror, and a conditional formula of $12.5<\theta M<17.5$ is satisfied, wherein $\theta M$ indicates an angle in degrees between the YZ plane and a central axis of a light beam traveling toward the curved mirror.

BRIEF DESCRIPTION OF THE DRAWINGS

FIGS. 3A, 3B, and 3C are graphs showing characteristics of an optical scanner according to the first embodiment in the case of Numerical Example 1, wherein FIG. 3A shows an error in $f\theta$, FIG. 3B an amount of curvature of field, and FIG. 3C an amount of residual curvature of scanning line;

FIGS. 4A, 4B, and 4C are graphs showing characteristics of an optical scanner according to the first embodiment in the case of Numerical Example 2, wherein FIG. 4A shows an error in $f\theta$, FIG. 4B an amount of curvature of field, and FIG. 4C an amount of residual curvature of scanning line;

FIGS. 5A, 5B, and 5C are graphs showing characteristics of an optical scanner according to the first embodiment in the case of Numerical Example 3, wherein FIG. 6A shows an error in $f\theta$, FIG. 5B an amount of curvature of field, and FIG. 5C an amount of residual curvature of scanning line;

FIGS. 6A, 6B, and 6C are graphs showing characteristics of an optical scanner according to the first embodiment in the case of Numerical Example 4, wherein FIG. 6A shows an error in $f\theta$, FIG. 6B an amount of curvature of field, and FIG. 6C an amount of residual curvature of scanning line;

FIGS. 7A, 7B, and 7C are graphs showing characteristics of an optical scanner according to the first embodiment in the case of Numerical Example 5, wherein FIG. 7A shows an error in $f\theta$, FIG. 7B an amount of curvature of field, and FIG. 7C an amount of residual curvature of scanning line;

FIGS. 8A, 8B, and 8C are graphs showing characteristics of an optical scanner according to the first embodiment in the case of Numerical Example 6, wherein FIG. 8A shows an error in $f\theta$, FIG. 8B an amount of curvature of field, and FIG. 8C an amount of residual curvature of scanning line;

FIGS. 9A, 9B, and 9C are graphs showing characteristics of an optical scanner according to the first embodiment in the case of Numerical Example 7, wherein FIG. 9A shows an error in $f\theta$, FIG. 9B an amount of curvature of field, and FIG. 9C an amount of residual curvature of scanning line;

BEST MODE FOR CARRYING OUT THE INVENTION

Embodiments of the present invention are described with reference to FIGS. 1 to 8 as follows.

First Embodiment

Figure 1:
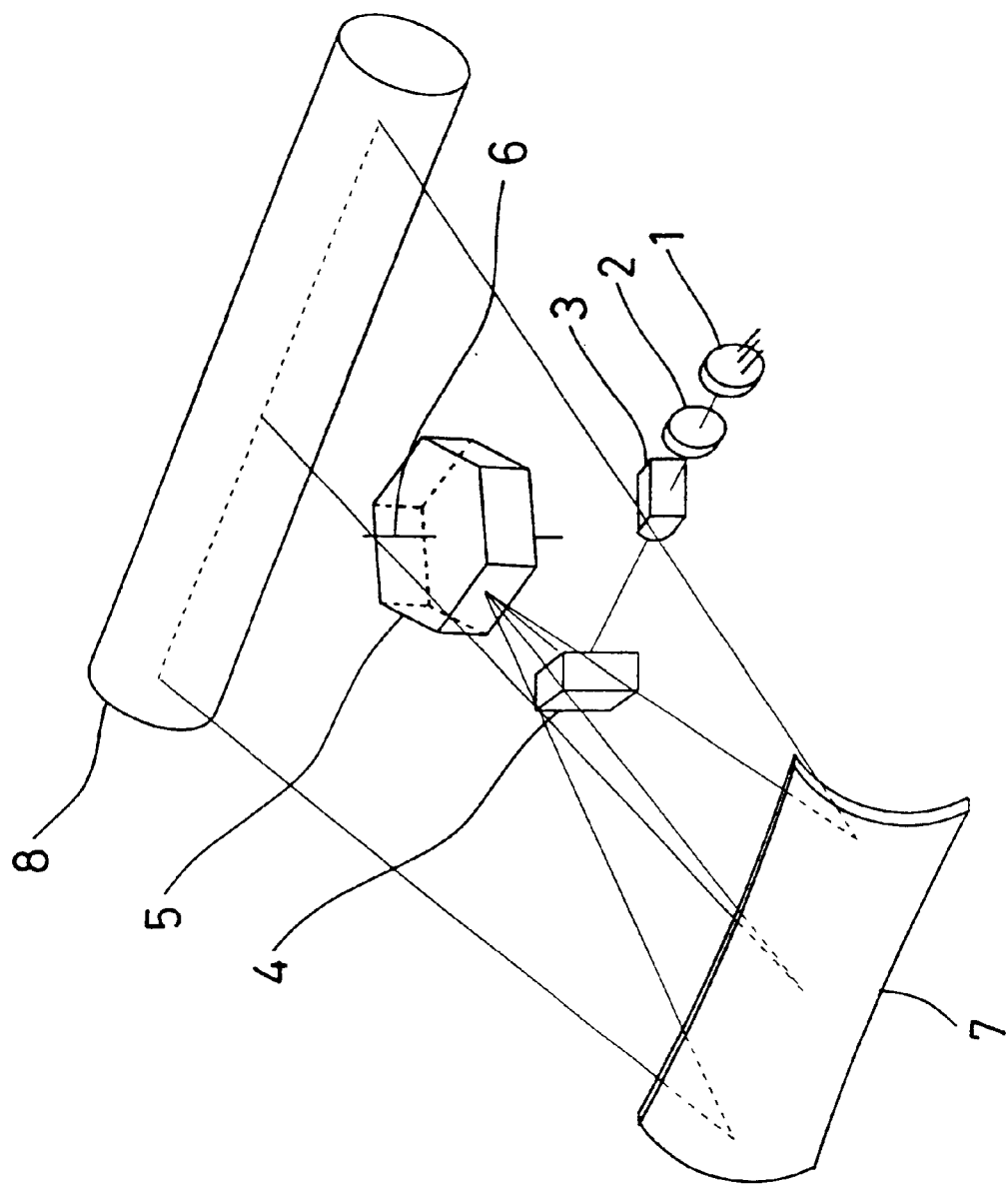
FIG. 1 is a schematic block diagram showing an optical scanner according to a first embodiment of the present invention.

FIG. 1 is a perspective view showing a configuration of an optical scanner according to a first embodiment of the present invention. In FIG. 1, numeral 1 indicates a semiconductor laser, numeral 2 an axisymmetric lens, numeral 3 a cylindrical lens having refracting power in a sub scanning direction only, numeral 4 a reflecting mirror, numeral 5 a polygon mirror, numeral 7 a curved mirror, and numeral 8 a photoconductive drum as a surface to be scanned. Numeral 6 indicates a rotation central axis of the polygon mirror 5.

Figure 2:
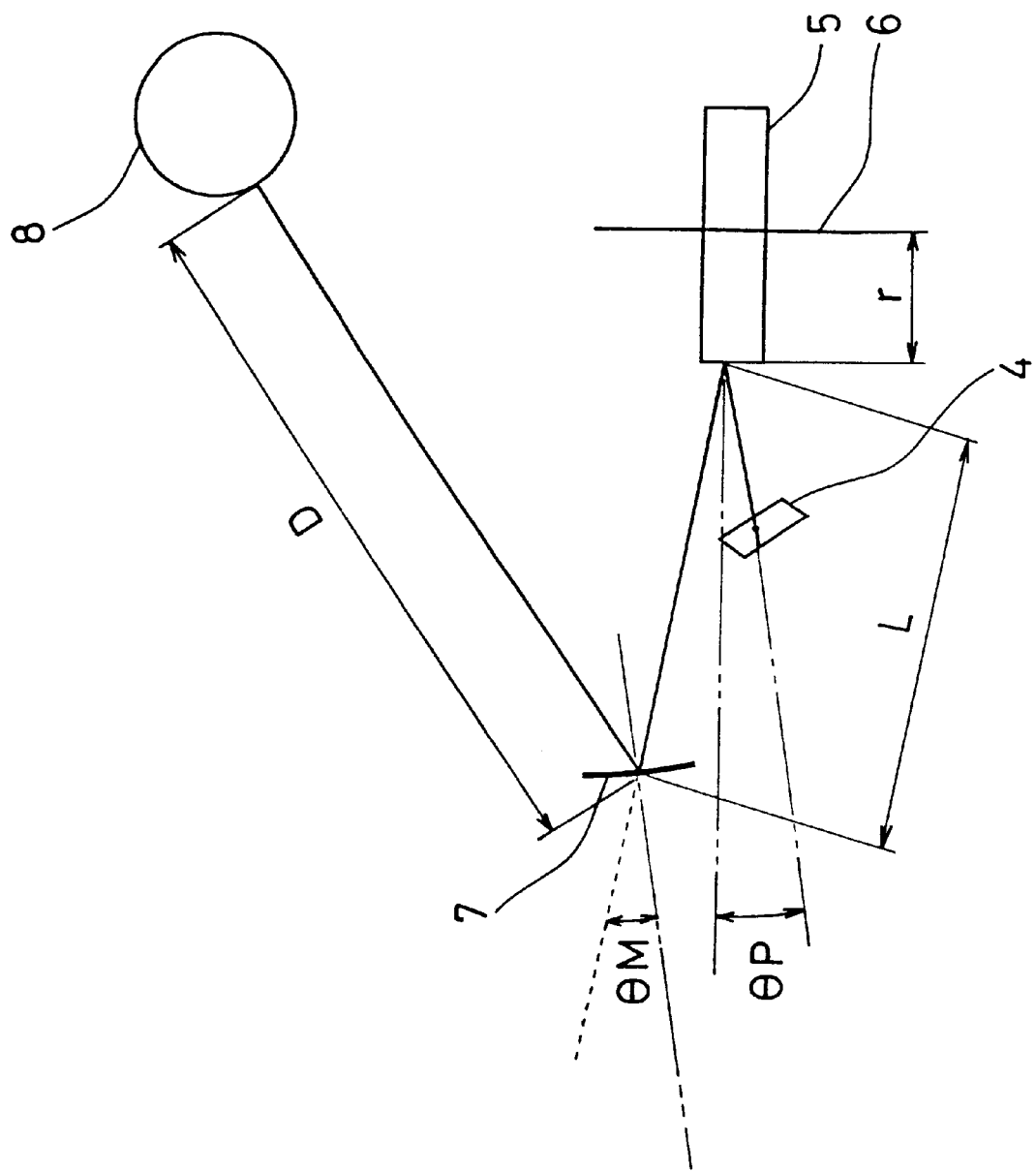
FIG. 2 is a sectional view of the optical scanner according to the first embodiment, taken in a plane parallel to a sub scanning direction.
Figure 3C:
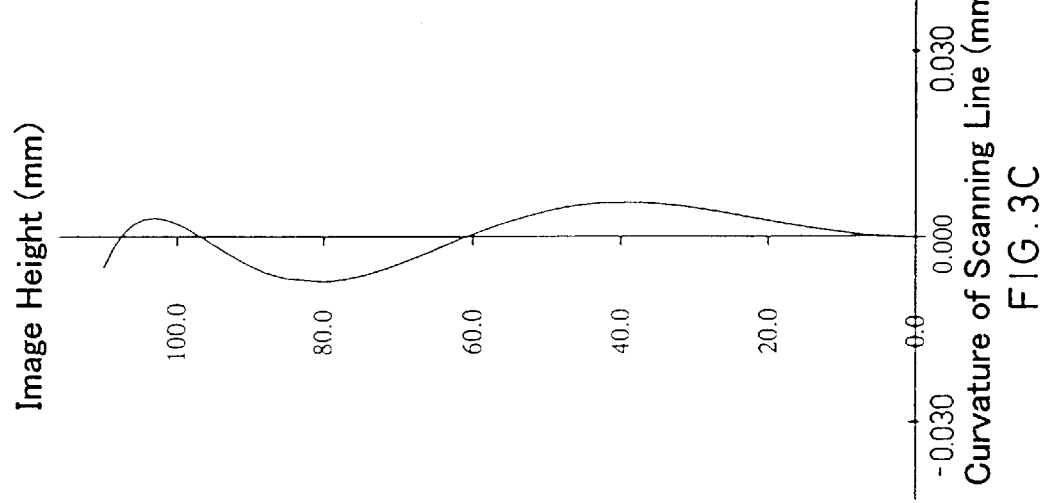
Figure 3B:
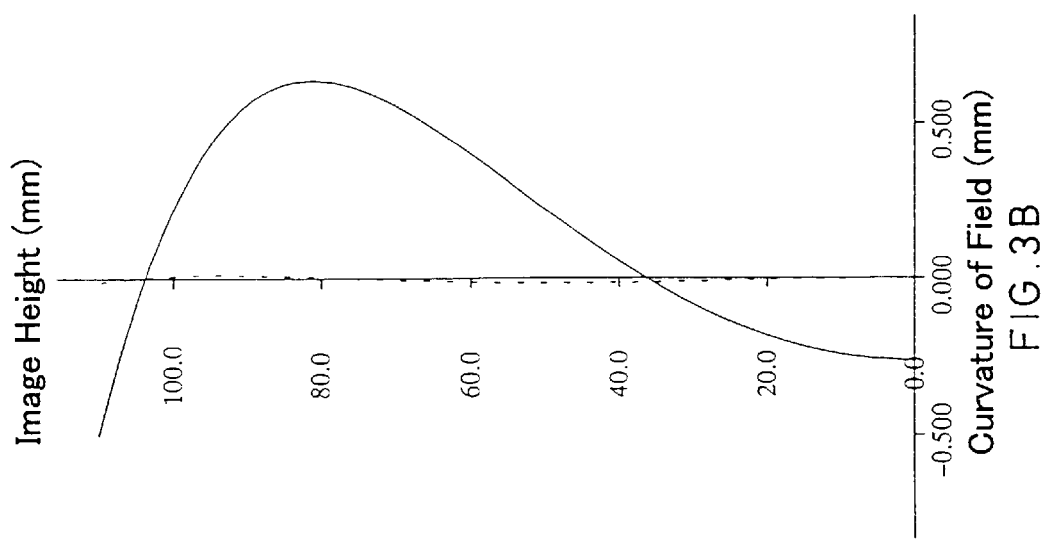
Figure 3A:
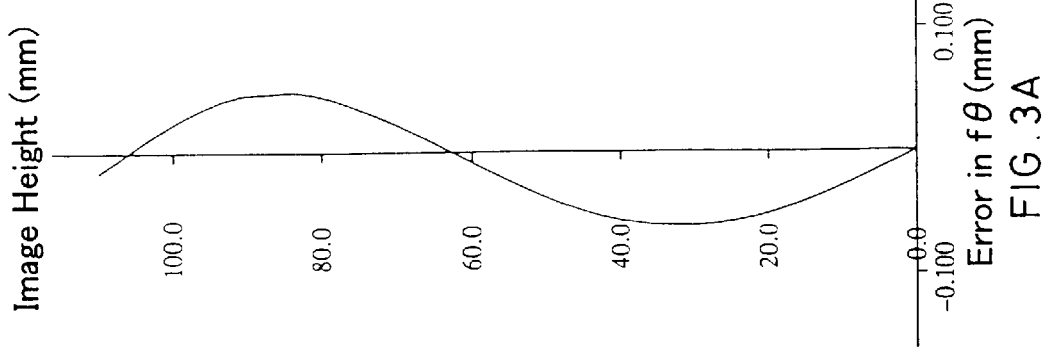
Figures 6A, 6B, 6C:
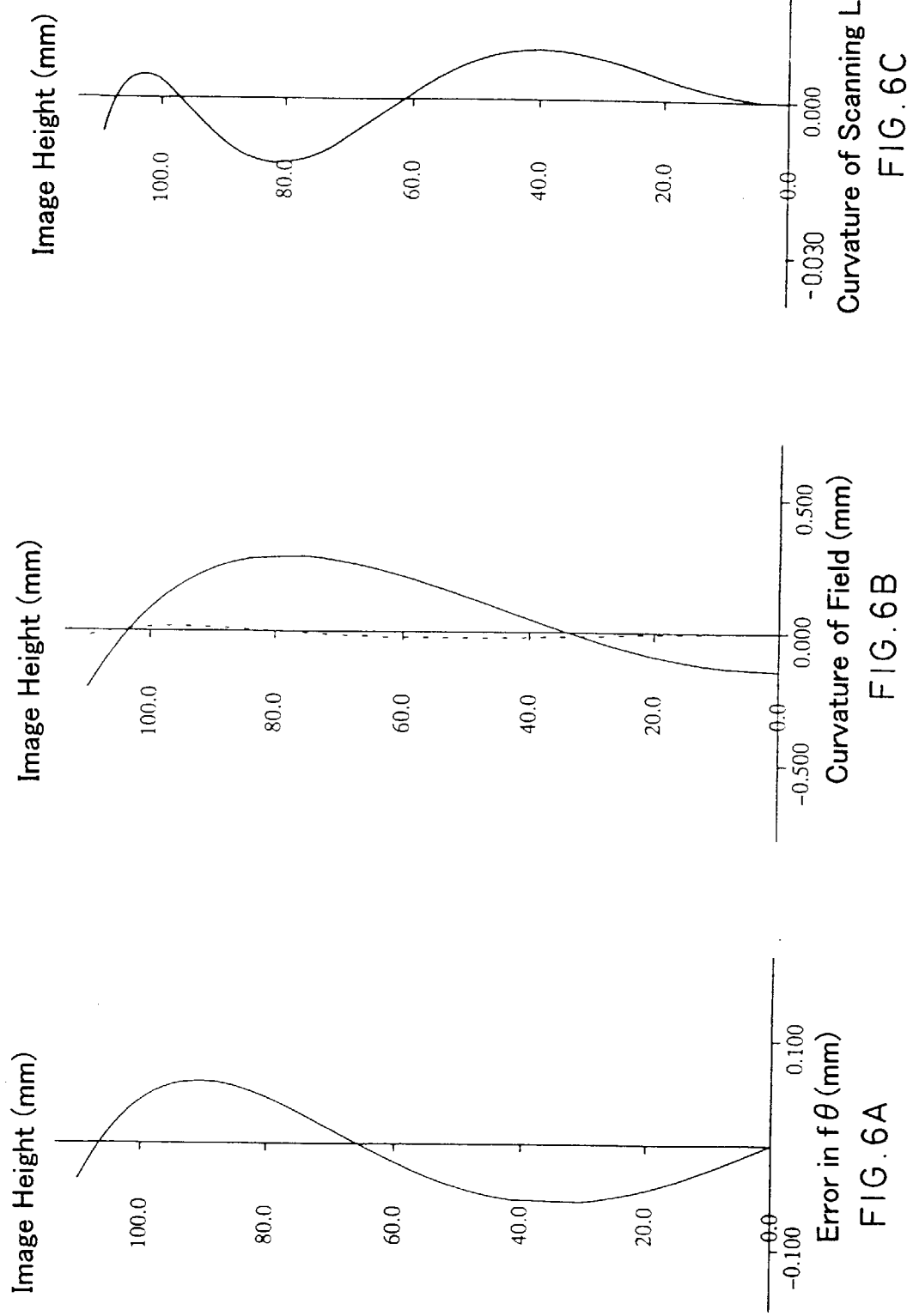
Figure 7C:
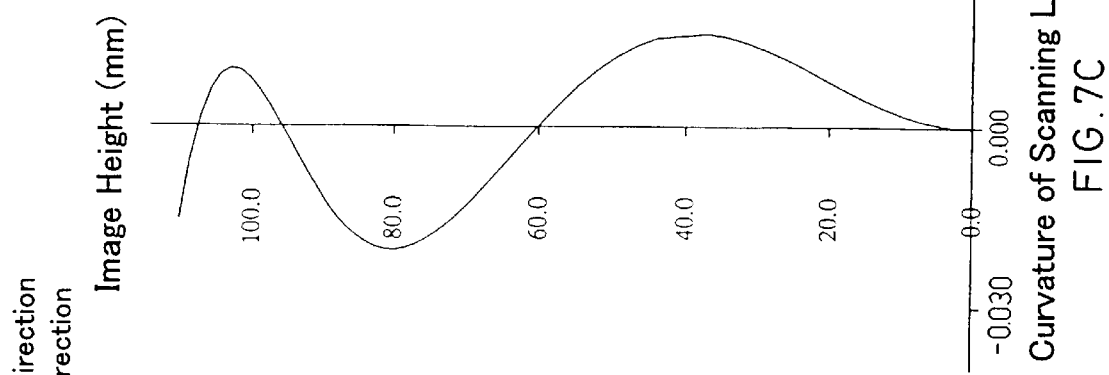
Figure 7B:
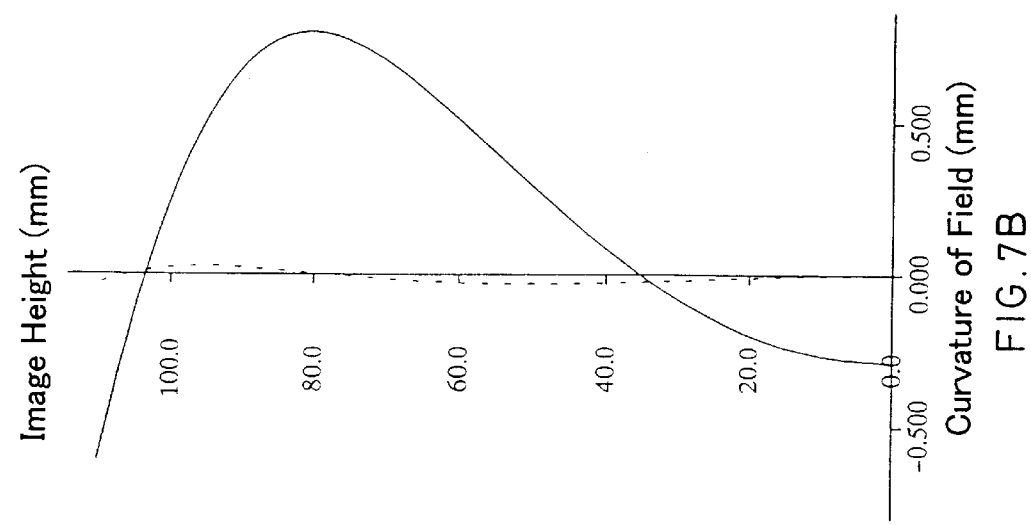
Figure 7A:
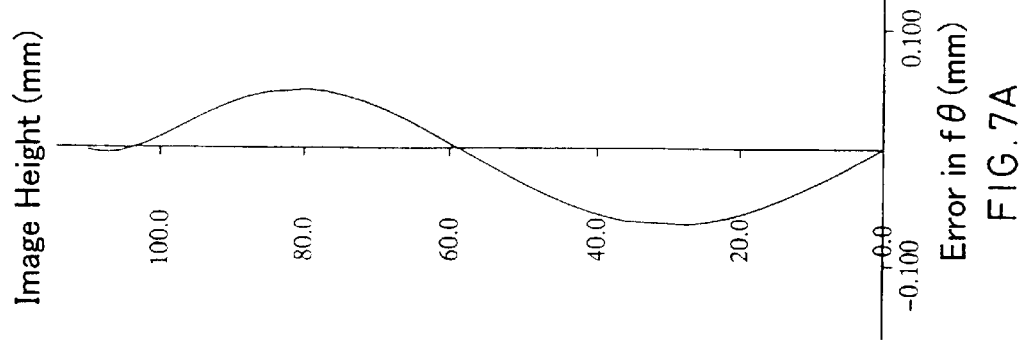

FIG. 2 is a sectional view taken in a plane that is parallel to a sub scanning direction and contains a scanning center axis of the optical scanner shown in FIG. 1. The reflecting mirror 4 is disposed obliquely with respect to the sub scanning direction so that a light beam from the reflecting mirror 4 is incident obliquely on a deflection surface of the polygon mirror 5 and a light beam from the polygon mirror 5 is incident obliquely on the curved mirror 7.

In the figure, r denotes an inscribed circle radius of the polygon mirror 5, L the interval between a deflection reflecting point and the curved mirror 7, D the interval between the curved mirror 7 and the photoconductive drum 8, θP an angle in degrees between an optical axis of light from the reflecting mirror 4 and a line normal to a deflection reflecting surface, and θM an angle in degrees between an optical axis of light from the deflection reflecting surface and a line normal to the vertex of the curved mirror 7.

The plane profile of the curved mirror used in each example described later is expressed by the following formula (4):

$$Z = f(y) + \frac{\frac{x^2}{g(y)} - 2x \cdot \sin\{\theta(y)\}}{\cos\{\theta(y)\} + \sqrt{\cos^2\{\theta(y)\} - \left[\frac{x}{g(y)}\right]^2} + \frac{2x \cdot \sin\{\theta(y)\}}{g(y)}} \quad (4)$$

wherein the vertex of the plane is regarded as an origin, an amount of sag from the vertex at a position indicated with x (mm) and y (mm) on coordinates in the sub and main scanning directions, respectively, is indicated as z (mm) with the direction in which an incident light beam travels regarded as positive. In the above-mentioned formula (4), the following formulae hold:

$$f(y) = \frac{\left[\frac{y^2}{RDy}\right]}{1 + \sqrt{1 - (1+k)\left[\frac{y}{RDy}\right]^2}} + ADy^4 + AEy^6 + AFy^8 + AGy^{10} \quad (5)$$

The above-mentioned formula f(y) expresses a noncircular arc as a shape on a generator, g(y) a radius of curvature at the position y in the sub scanning direction (the x direction), and θ(y) a skew amount at the position y. In addition, RDy (mm) indicates a radius of curvature at the vertex in the main scanning direction, RDx (mm) a radius of curvature in the sub scanning direction, K a cone constant indicating a generator shape, AD, AE, AF, and AG higher order constants indicating the generator shape, BC, BD, BE, BF, and BG constants determining the radius of curvature at the position y in the sub scanning direction, and EC, ED, and EE skew constants determining the skew amount at the position y.

Specific numerical examples are indicated as follows. In the following, a maximum image height is indicated as Ymax and a polygon rotation angle corresponding thereto as αmax.

TABLE 1

Numerical Example 1

| | | | | | | | |
|---|---|---|---|---|---|---|---|
| Ymax | 110 | αmax | 23.171 | | | | |
| θP | 10 | θM | 15 | | | | |
| L | 120.0 | D | 57.51 | | r | 17.32 | |
| RDy | −334.92 | K | 0.00000E-00 | AD | −3.62302E-09 | AE | −2.73024E-13 |
| AF | 0.00000E-00 | AG | 0.00000E-00 | | | | |
| RDx | −80.52 | BC | −2.89732E-05 | BD | −4.28918E-11 | BE | 0.00000E-00 |
| BF | 0.00000E-00 | BG | 0.00000E-00 | | | | |
| | | EC | −5.82583E-06 | ED | −1.13810E-10 | EE | −1.19931E-14 |

TABLE 2

Numerical Example 2

| | | | | | | | |
|---|---|---|---|---|---|---|---|
| Ymax | 110 | αmax | 23.171 | | | | |
| θP | 12 | θM | 15 | | | | |
| L | 120.0 | D | 59.83 | | R | 17.32 | |
| RDy | −336.80 | K | 0.00000E-00 | AD | −3.49531E-09 | AE | −2.57312E-13 |
| AF | 0.00000E-00 | AG | 0.00000E-00 | | | | |
| RDx | −82.69 | BC | −2.82629E-05 | BD | −3.28026E-11 | BE | 0.00000E-00 |
| BF | 0.00000E-00 | BG | 0.00000E-00 | | | | |
| | | EC | −5.60722E-06 | ED | −1.15858E-10 | EE | −1.03247E-14 |

TABLE 3

Numerical Example 3

| | | | | | | |
|---|---|---|---|---|---|---|
| Ymax | 110 | αmax | 23.171 | | | |
| θP | 15 | θM | 15 | | | |
| L | 120.0 | D | 63.66 | R | 17.32 | |

| | | | | | | | | |
|---|---|---|---|---|---|---|---|---|
| RDy | −341.34 | K | 0.00000E-00 | AD | −3.24365E-09 | AE | −2.24859E-13 |
| AF | 0.00000E-00 | AG | 0.00000E-00 | | | | |
| RDx | −86.15 | BC | −2.70059E-05 | BD | −1.46493E-11 | BE | 0.00000E-00 |
| BF | 0.00000E-00 | BG | 0.00000E-00 | | | | |
| | | EC | −5.26775E-06 | ED | −1.17342E-10 | EE | −8.03818E-15 |

TABLE 4

Numerical Example 4

| | | | | | | |
|---|---|---|---|---|---|---|
| Ymax | 110 | αmax | 23.171 | | | |
| θP | 10.6 | θM | 15 | | | |
| L | 100.0 | D | 104.63 | R | 17.32 | |

| | | | | | | | | |
|---|---|---|---|---|---|---|---|---|
| RDy | −303.46 | K | 0.00000E-00 | AD | 1.80096E-09 | AE | −1.24638E-13 |
| AF | 0.00000E-00 | AG | 0.00000E-00 | | | | |
| RDx | −105.92 | BC | −1.91645E-05 | BD | 9.15253E-11 | BE | 0.00000E-00 |
| BF | 0.00000E-00 | BG | 0.00000E-00 | | | | |
| | | EC | −5.30805E-06 | ED | −7.70761E-11 | EE | −1.93654E-15 |

TABLE 5

Numerical Example 5

| | | | | | | |
|---|---|---|---|---|---|---|
| Ymax | 110 | αmax | 23.171 | | | |
| θP | 8.6 | θM | 10 | | | |
| L | 125.0 | D | 42.51 | R | 17.32 | |

| | | | | | | | | |
|---|---|---|---|---|---|---|---|---|
| RDy | −344.03 | K | 0.00000E-00 | AD | −4.60135E-09 | AE | −4.72521E-13 |
| AF | 0.00000E-00 | AG | 0.00000E-00 | | | | |
| RDx | −64.44 | BC | −3.67525E-05 | BD | −2.00372E-10 | BE | 0.00000E-00 |
| BF | 0.00000E-00 | BG | 0.00000E-00 | | | | |
| | | EC | −4.70394E-06 | ED | −1.02999E-11 | EE | −2.59942E-14 |

TABLE 6

Numerical Example 6

| | | | | | | |
|---|---|---|---|---|---|---|
| Ymax | 110 | αmax | 23.171 | | | |
| θP | 24.8 | θM | 30 | | | |
| L | 30.0 | D | 57.85 | R | 17.32 | |

| | | | | | | | | |
|---|---|---|---|---|---|---|---|---|
| RDy | −337.35 | K | 0.00000E-00 | AD | −6.04413E-09 | AE | −7.15054E-13 |
| AF | 0.00000E-00 | AG | 0.00000E-00 | | | | |
| RDx | −92.49 | BC | −3.34619E-05 | BD | −3.90448E-10 | BE | 3.46428E-14 |
| BF | 0.00000E-00 | BG | 0.00000E-00 | | | | |
| | | EC | −1.06790E-05 | ED | −3.11321E-10 | EE | −2.48477E-14 |

TABLE 7

Numerical Example 7

| | | | | | | |
|---|---|---|---|---|---|---|
| Ymax | 110 | αmax | 17.484 | | | |
| θP | 12 | θM | 15 | | | |
| L | 164.0 | D | 75.27 | R | 20 | |

| | | | | | | | | |
|---|---|---|---|---|---|---|---|---|
| RDy | −432.18 | K | 0.00000E-00 | AD | −2.05312E-09 | AE | −6.01611E-14 |
| AF | 0.00999E-00 | AG | 0.00000E-00 | | | | |
| RDx | −106.89 | BC | −1.71971E-05 | BD | −1.09012E-11 | BE | 0.00000E-00 |
| BF | 0.00000E-00 | BG | 0.00000E-00 | | | | |
| | | EC | −3.19258E-06 | ED | −7.70809E-1 | EE | 0.00000E-00 |

With respect to the optical scanners with the configurations described above, their operations are described with reference to FIGS. 1 and 2 as follows.

A light beam from the semiconductor laser 1 is converted into convergent light by the axisymmetric lens 2. The convergent light is converged only in the sub scanning direction by the cylindrical lens 3 and then is reflected by the reflecting mirror 4 to form a line image on a reflecting surface of the polygon mirror 5. The polygon mirror 5 rotates about the rotation central axis 6, so that a light beam is scanned and is reflected by the curved mirror 7 to form an image on the surface 8 to be scanned. With respect to the shape of the curved mirror 7, the noncircular-arc shape of the cross section in the main scanning direction and the curvature of field in the sub scanning direction corresponding to each image height are determined to compensate for the curvature of main and sub fields and the error in fθ, and in addition, the skew amount in the plane at a position corresponding to each image height is determined to compensate for the curvature of the scanning line.

Table 8 shows wave front aberrations at the scanning center and maximum image height in each numerical example.

FIGS. 3 to 9 show characteristics in the cases of Numerical Examples 1 to 7, respectively. In the respective figures, the figures A, B, and C show an error in fθ, an amount of curvature of field, and an amount of a residual curvature of scanning line, respectively.

The error in fθ ($\Delta Y$) is an amount expressed by the following formula (8):

$$\Delta Y = Y - V \times \alpha \qquad (8),$$

wherein V (mm/deg) indicates a scanning rate (a rate at which a beam of light is scanned on the photoconductive drum surface) per unit rotation angle of the polygon in the vicinity of the scanning center, $\alpha$ (degree) a polygon rotation angle, and Y (mm) image height.

When a wavelength variable laser is used as the semiconductor laser 1, its wavelength is controlled, so that the size of a spot formed on the photoconductive drum 8 can be controlled freely.

In the present embodiment, the formula (4) was used to express the curved mirror profile, but other formulae may be used as long as they can express the identical shape thereto.

Second Embodiment

Figure 10:
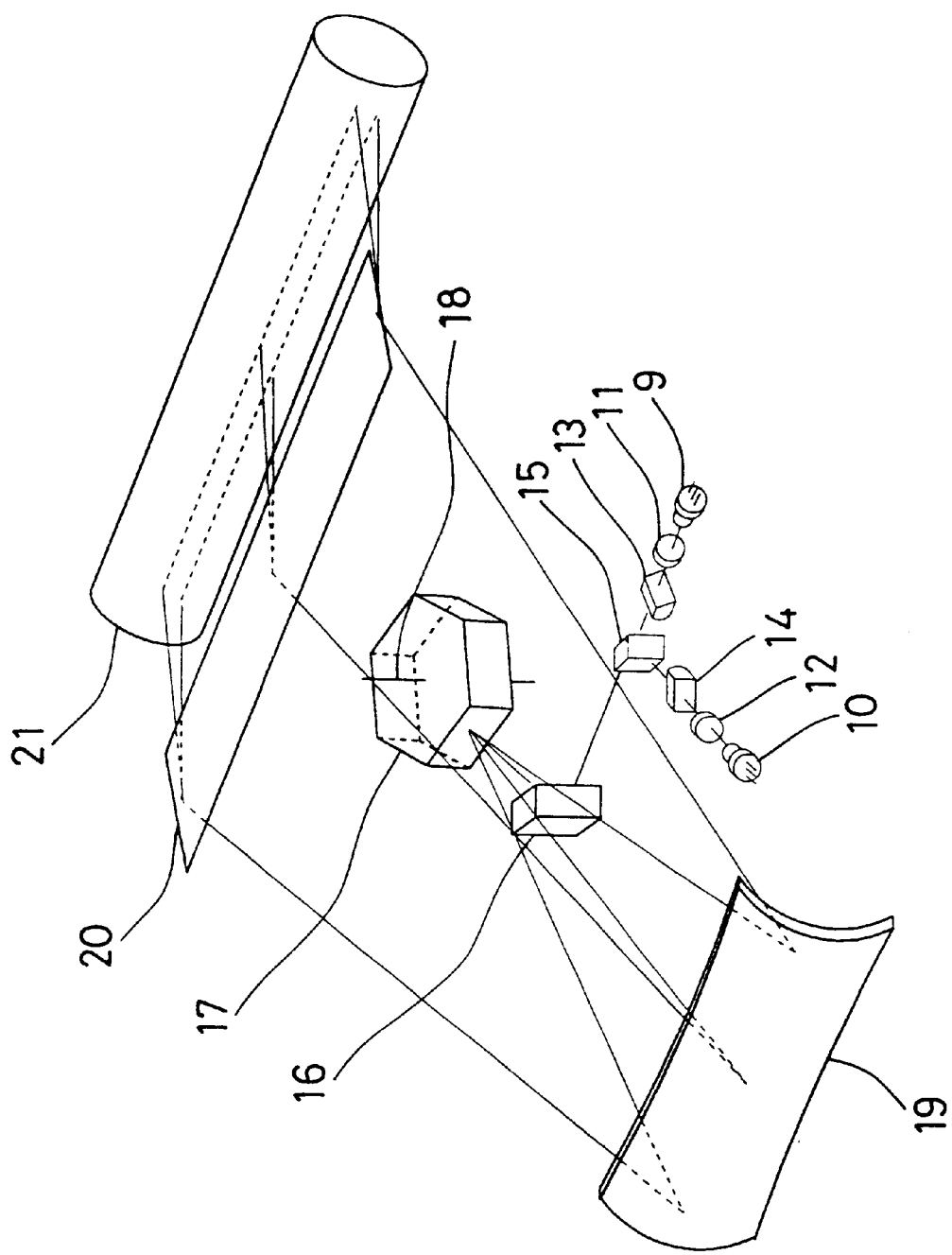
FIG. 10 is a structural view showing an optical scanner according to a second embodiment of the present invention.

FIG. 10 is a structural view of an optical scanner according to a second embodiment with the configuration corresponding to claim 18.

TABLE 8

| Numerical Example | 1 | 2 | 3 | 4 | 5 | 6 | 7 |
|---|---|---|---|---|---|---|---|
| θM/θP + 0.98 L/(L + D) | 2.163 | 1.904 | 1.640 | 1.894 | 1.894 | 1.888 | 1.922 |
| Wave Front Aberration (mλ) | | | | | | | |
| Center | 2 | 2 | 2 | 5 | 4 | 5 | 2 |
| Maximum Image Height | 54 | 7 | 68 | 16 | 11 | 12 | 6 |

Numerical Examples 1 to 3 are designed under the conditions of L=120 and θM=15 with θP varied. Numeral Example 2 is the optimum design example in which the beam aberration caused by oblique incidence can be compensated. Numeral Examples 1 and 3 are design examples with values in the vicinity of the upper and lower limits of the following conditional formula (1), respectively.

$$1.6 < \theta M/\theta P + 0.98 L/(L+D) < 2.2 \qquad (1)$$

Numerical Examples 4 to 7 are design examples with an optimum θP determined relative to each L and θM and satisfy the following conditional formula (2).

$$1.86 < \theta M/\theta P + 0.98 L/(L+D) < 1.94 \qquad (2)$$

Table 9 shows the ratio of a beam (with an intensity of $1/e^2$) diameter in the sub scanning direction at the scanning center to that at a maximum image height in each numerical example.

TABLE 9

| Numerical Example | 1 | 2 | 3 | 4 | 5 | 6 | 7 |
|---|---|---|---|---|---|---|---|
| L/(L + D) | 0.68 | 0.67 | 0.65 | 0.49 | 0.75 | 0.69 | 0.69 |
| Beam Diameter Ratio in Sub Scanning Direction | 0.65 | 0.62 | 0.78 | 0.72 | 0.45 | 0.54 | 0.72 |

The respective numerical examples satisfy the following conditional formula (3):

$$0.48 < L/(L+D) < 0.75 \qquad (3).$$

In FIG. 10, numeral 9 indicates a first light source for emitting a light beam with a wavelength λ1, numeral 10 a second light source for emitting a light beam with a wavelength λ2, numeral 11 a first axisymmetric lens for converting light from the first light source 9 into convergent light, and numeral 12 a second axisymmetric lens for converting light from the second light source 10 into convergent light. Numeral 13 indicates a first cylindrical lens having refracting power in the sub scanning direction only and focusing the light beam from the first light source 9 on the deflection surface as a line image. Numeral 14 indicates a second cylindrical lens having refracting power in the sub scanning direction only and focusing the light beam from the second light source 10 on the deflection surface as a line image. Numeral 15 indicates a dichroic mirror transmitting light beams with the wavelength λ1 and reflecting light beams with the wavelength λ2, numeral 16 a reflecting mirror, numeral 17 a polygon mirror, and numeral 18 a rotation central axis of the polygon mirror 17. Numeral 19 indicates a curved mirror. The curved mirror 19 has a shape and arrangement indicated in any one of Numerical Examples 1 to 4 described in the first embodiment. Numeral 20 indicates a diffraction grating for separating light beams with the wavelengths λ1 and λ2 from each other. Numeral 21 indicates a photoconductive drum.

An operation of the optical scanner with the above-mentioned configuration is described. Light beams with two different wavelengths mixed by the dichroic mirror 15 are scanned by the polygon mirror 17 and are converted into convergent light by the curved mirror 19. A light beam incident on the diffraction grating 20 is separated into two light beams by the diffraction grating 20, and the two light beams form images on the photoconductive drum 21. This allows two lines to be scanned by one-time scanning. In this case, no chromatic aberration occurs in the curved mirror 19. Hence, both the two light beams separated by the diffraction grating 20 form excellent images on the photoconductive drum 21. In the present embodiment, as a mixing means, the dichroic mirror was used, but a half mirror also may be used. Furthermore, as the light separating means, the diffraction grating was used, but a dichroic mirror also may be used.

In the above-mentioned embodiment, two-line scanning was carried out with a light separating means, but it also is possible to carry out multiwavelength scanning without providing the light separating means.

Third Embodiment

Figure 11:
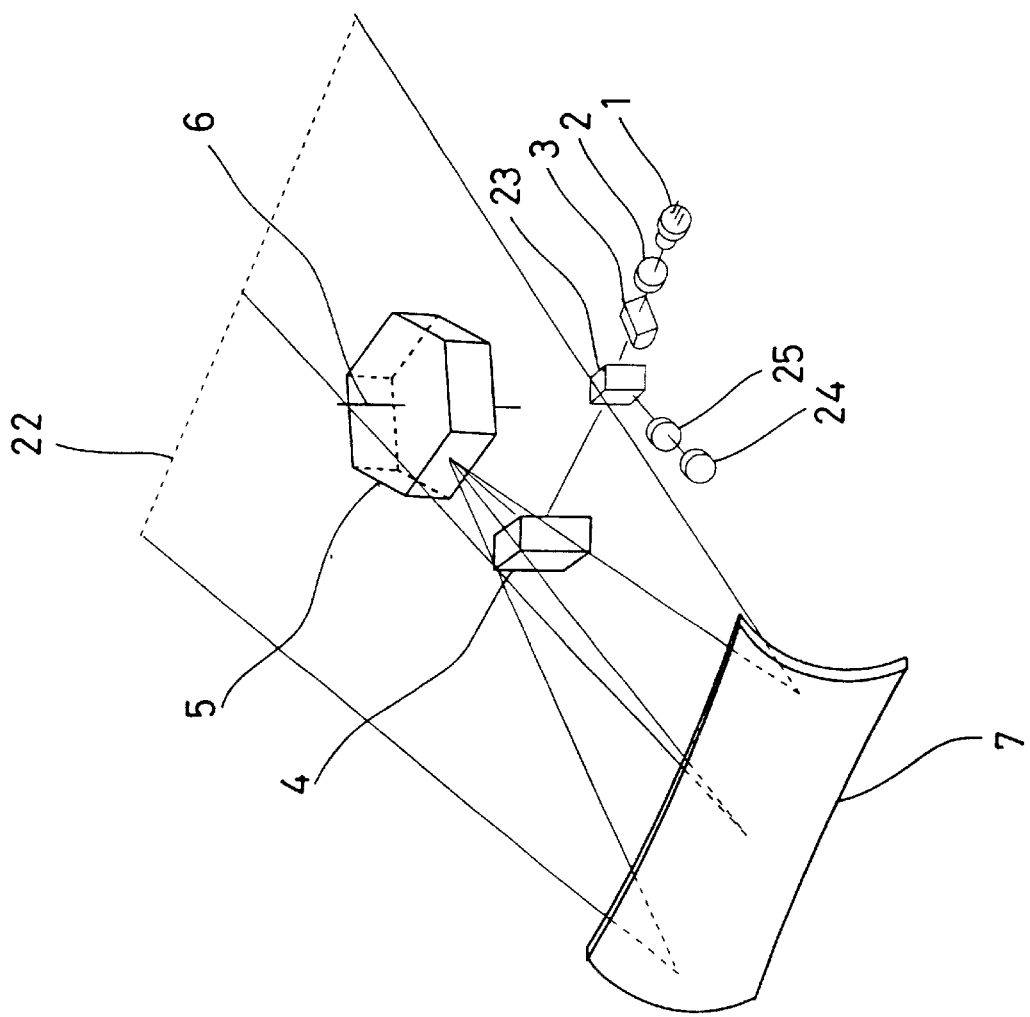
FIG. 11 is a structural view of an image reader with an optical scanner of the present invention.

FIG. 11 is a structural view of an image reader according to a third embodiment with the configuration corresponding to claim 21.

In FIG. 11, numerals 1 to 7 indicate the same elements as those of the optical scanner shown in FIG. 1. Numeral 22 indicates a surface subjected to reading, numeral 23 a half mirror for transmitting light beams from a light source 1 and reflecting light returned from the surface 22 to a detection system, numeral 24 a detector, and 25 a detection optical system for guiding returned light to the detector 24.

As described above, with the optical scanner according to the present embodiment, a small high-resolution image reader can be obtained at low cost.

Fourth Embodiment

Figure 12:
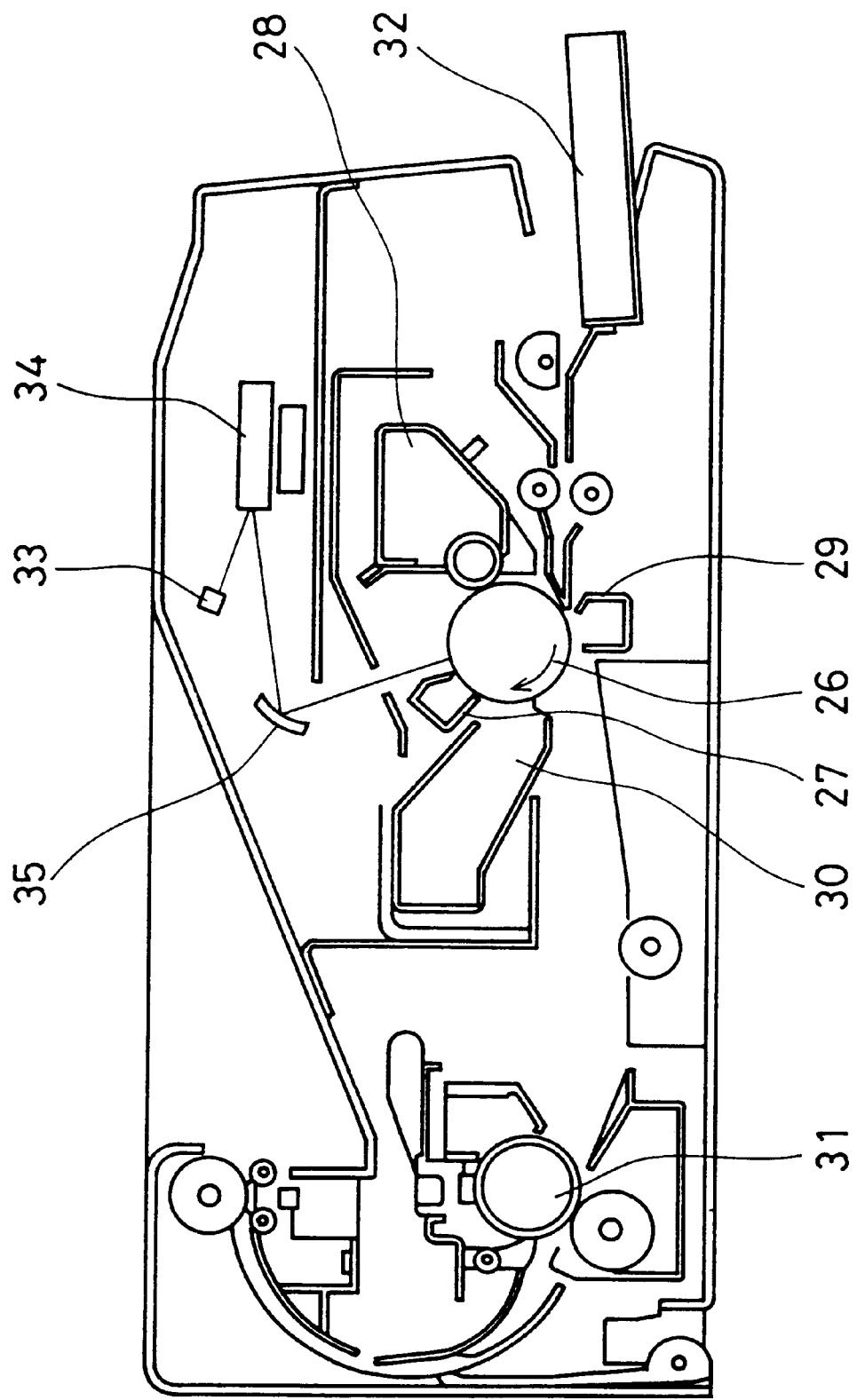
FIG. 12 is a schematic sectional view of an image forming apparatus with an optical scanner of the present invention.

FIG. 12 is a schematic sectional view showing an image forming apparatus with an optical scanner described in the first or second embodiment. In FIG. 12, numeral 26 indicates a photoconductive drum whose surface is covered with a photoconductive layer in which an amount of charges is varied upon light irradiation, numeral 27 a primary charger for providing electrostatic ions to the surface of the photoconductive layer to be charged, numeral 28 a developing unit for allowing charged toner to adhere to a printing portion, numeral 29 a transfer charger for transferring the thus adhered toner to a paper, numeral 30 a cleaner for removing residual toner, numeral 31 a fixing device for fixing the toner transferred to the paper, numeral 32 a paper feed cassette, numeral 33 a light source block including a semiconductor laser, an axisymmetric lens and a cylindrical lens, numeral 34 a polygon mirror, and numeral 35 the curved mirror shown in the first embodiment.

As described above, with an optical scanner according to this embodiment, a small image forming apparatus can be obtained at low cost.

Fifth Embodiment

Figure 13:
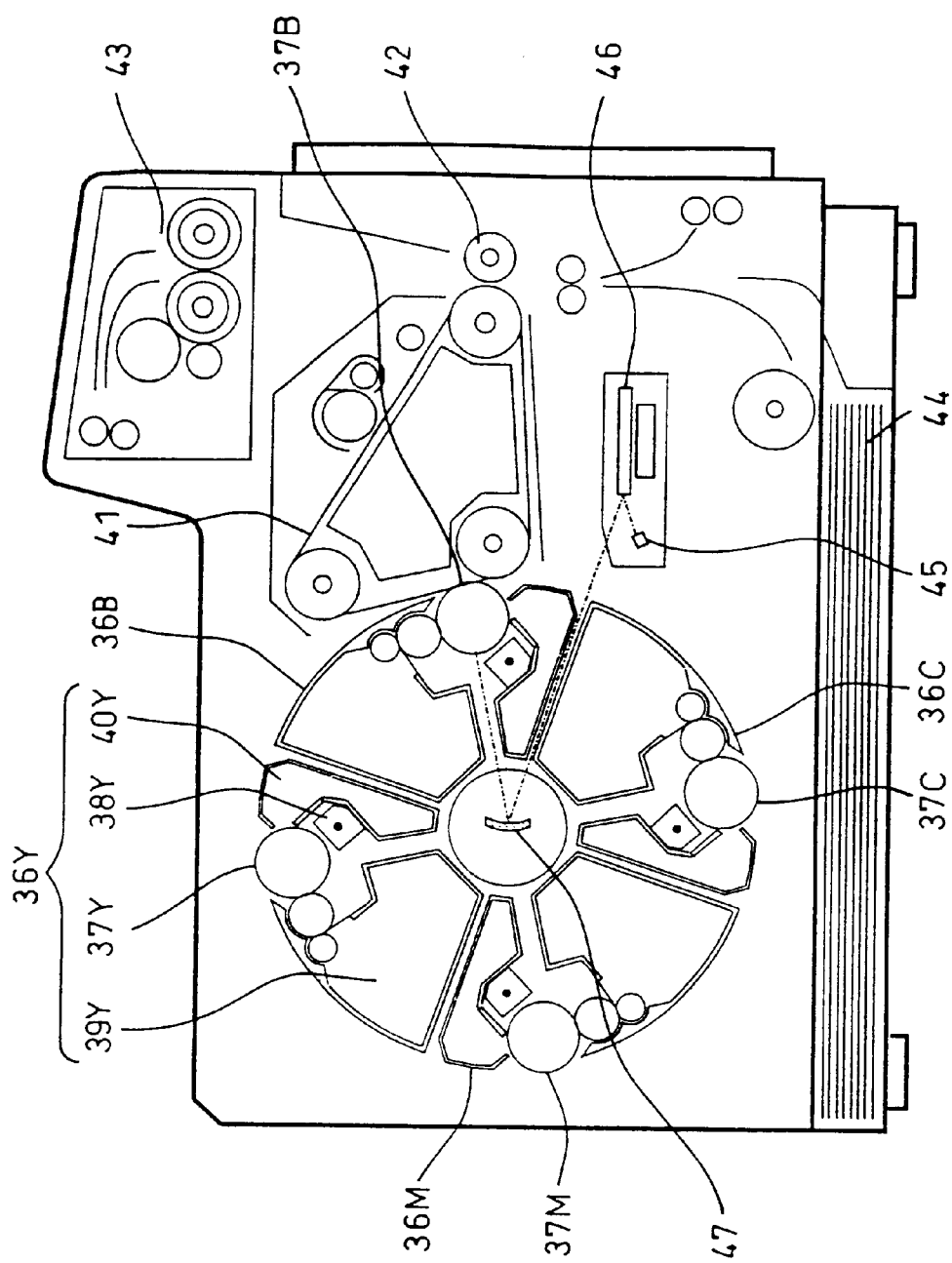
FIG. 13 is a schematic sectional view of a color image forming apparatus with an optical scanner of the present invention.

FIG. 13 is a schematic sectional view showing a color image forming apparatus with an optical scanner according to the first or second embodiment.

In FIG. 13, numeral and characters 36Y, 36M, 36C, and 36B indicate image forming units corresponding to colors of yellow, magenta, cyan, and black, respectively. The image forming unit 36Y includes a photoconductive drum 37Y whose surface is covered with a photoconductive layer in which an amount of charge is varied upon light irradiation, a primary charger 38Y for providing electrostatic ions to the surface of the photoconductive layer to be charged, a developing unit 39Y for allowing charged toner to adhere to a printing portion, and a cleaner 40Y for removing residual toner. The image forming units 36M, 36C, and 36B for the other colors have the same configuration as that of the image forming unit 36Y.

Numeral 41 indicates a transfer belt for transferring toner images formed on the photoconductive drums 37Y, 37M, 37C, and 37B for the respective colors, numeral 42 a transfer charger for transferring the toner adhered to the transfer belt 41 to a paper, numeral 43 a fixing device for fixing the thus transferred toner to the paper, and numeral 44 a paper feed cassette. Numeral 45 indicates a light source block including a semiconductor laser, an axisymmetric lens and a cylindrical lens, numeral 46 a polygon mirror, and numeral 47 the curved mirror for which one described in the first embodiment can be used.

As is apparent from FIG. 13, the image forming unit 36Y and the others corresponding to the four colors are maintained to be arranged in a cylindrical form. The image forming unit 36Y and the others are each rotated about the central axis of the cylindrical form at the same time, so that the photoconductive drums 37Y and the others are allowed to come into contact with the transfer belt 41 sequentially. As the image forming unit 36Y and the others are changed in turn, an electrostatic latent image is formed on each of the photoconductive drums 37Y and the others, using the light source block 45, the polygon mirror 46, and the curved mirror 47. Furthermore, toner images are formed by the developing unit 39Y and the others, respectively. The toner images of the respective colors formed on the photoconductive drums 37Y and the others, respectively, are transferred to the transfer belt 41 sequentially. Thus, the toner images of the respective colors are superimposed and a color toner image is formed on the transfer belt 41.

The optical scanner including the light source block 45, the polygon mirror 46, and the curved mirror 47 is designed so that the reflection angle of a light beam reflected by the curved mirror is 30 degrees, which is the optimum angle for the color image forming apparatus according to the present embodiment. Consequently, the curved mirror 47 alone is disposed in the vicinity of the central axis of the cylindrical form and the light beam reflected by the curved mirror 47 is guided directly to the photoconductive drums 37Y and the others.

With the above-mentioned configuration, a small color image forming apparatus can be obtained at low cost.

Industrial Applicability

According to the optical scanner of the present invention, the second image formation optical system is composed of one curved mirror alone, the optical scanner guides a light beam from the curved mirror directly to the photoconductive drum without requiring a reflecting mirror, the curved mirror is allowed to have a shape permitting relatively easy processing and measurement, and thus an optical scanner with excellent optical performance can be obtained.

What is claimed is:

1. An optical scanner, comprising:

a light source unit for emitting a light beam;

an optical deflector for deflecting the light beam from the light source unit so as to cause scanning;

a first image formation optical system for forming a line image on a deflection surface of the optical deflector, disposed between the light source unit and the optical deflector; and a second image formation optical system composed of one curved mirror, disposed between the optical deflector and a surface to be scanned, a light beam from the first image formation optical system being incident obliquely on a plane that is parallel to a main scanning direction and contains a line normal to the deflection surface of the optical deflector, and a light beam from the optical deflector being incident obliquely on a plane (hereinafter referred to as a "YZ plane") that is parallel to the main scanning direction and contains a line normal to a vertex of the curved mirror, wherein a conditional formula of 10<θM<35 is satisfied, where θM indicates an angle in degrees between the YZ plane and a central axis of a light beam traveling toward the curved mirror from the optical deflector, and wherein the shape of the curved mirror is asymmetrical with respect to the YZ plane and has a skew so as to compensate curvature of a scanning line caused by oblique incidence, the skew being such that a line normal to each point other than a vertex of a curved line on which the YZ plane and a curved plane of the curved mirror intersect is not contained in the YZ plane.

2. The optical scanner according to claim 1, wherein in a cross section in a sub scanning direction, an angle made by a light beam reflected by the curved mirror with respect to an incident light beam from the deflection surface is negative when a direction of an angle made by a light beam reflected by the deflection surface with respect to an incident light beam from the first image formation optical system is regarded as positive.

3. The optical scanner according to claim 2, wherein the following conditional formula (1) is satisfied:

$$1.6 < \theta M/\theta P + 0.98 L/(L+D) < 2.2 \qquad (1),$$

wherein θP indicates an angle in degrees between the line normal to the deflection surface and the light beam from the first image formation optical system, L a distance from the deflection surface to the vertex of the curved mirror, and D a distance from the curved mirror to the surface to be scanned.

4. The optical scanner according to claim 3, wherein the following conditional formula (2) is satisfied:

$$1.86 < \theta M/\theta P + 0.98 L/(L+D) < 1.94 \qquad (2).$$

5. The optical scanner according to claim 1, wherein the following conditional formula (3) is satisfied:

$$0.48 < L/(L+D) < 0.75 \qquad (3),$$

wherein L indicates a distance from the deflection surface to the vertex of the curved mirror and D a distance from the curved mirror to the surface to be scanned.

6. The optical scanner according to claim 1, wherein the curved mirror has a cross section with a circular arc shape in a sub scanning direction.

7. The optical scanner according to claim 1, wherein an angle in degrees between the YZ plane and the line normal to each point on the generator increases with distance from the vertex.

8. The optical scanner according to claim 1, wherein a direction of an angle made by the line normal to each point on the generator with respect to the YZ plane is positive when an angle made by a light beam reflected from the curved mirror with respect to an incident light beam from the deflection surface is regarded as positive.

9. The optical scanner according to claim 1, wherein the curved mirror is an anamorphic mirror with different radii of curvature in the main scanning direction and in a sub scanning direction at the vertex.

10. The optical scanner according to claim 1, wherein the curved mirror has a mirror plane with concave shapes both in the main scanning direction and in a sub scanning direction.

11. The optical scanner according to claim 1, wherein the curved mirror has a mirror plane whose refracting power in a sub scanning direction varies between a center and a periphery in the main scanning direction.

12. The optical scanner according to claim 1, wherein the curved mirror has a cross section in a sub scanning direction whose radius of curvature does not depend on its cross-sectional shape in the main scanning direction.

13. The optical scanner according to claim 1, wherein the first image formation optical system converts the light beam from the light source unit into a convergent light beam with respect to the main scanning direction.

14. The optical scanner according to claim 1, wherein the light source unit comprises a wavelength variable light source and a wavelength controller.

15. An image reader comprising an optical scanner according to claim 1.

16. An image forming apparatus comprising an optical scanner according to claim 1.

17. A color image forming apparatus, comprising:
a conveying member including a plurality of image forming units corresponding to a plurality of colors, the plurality of image forming units being assembled in a substantially cylindrical form, each of the plurality of image forming units including a developing unit and a photoconductor and being maintained to be arranged circumferentially in the substantially cylindrical form, the conveying member simultaneously rotating the plurality of image forming units around a central axis of the substantially cylindrical form to move each of the plurality of image forming units between an image formation position and a stand-by position;
a transfer member having a transfer body that can come into contact with the photoconductor of an image forming unit positioned at the image formation position, sequentially transferring each of toner images of the plurality of colors formed on each photoconductor onto the transfer body as the image forming unit at the image formation position is changed in turn, and superimposing the toner images of the plurality of colors to form a color toner image on the transfer body; and
an optical scanner for exposing the photoconductor to light,
wherein the optical scanner is an optical scanner according to claim 1.

18. The color image forming apparatus according to claim 17, wherein the curved mirror of the second image formation optical system in the optical scanner is disposed in the vicinity of a central axis of the substantially cylindrical form.

19. The color image forming apparatus according to claim 17, wherein in the optical scanner, a light beam from the first image formation optical system is incident obliquely on a plane that is parallel to the main scanning direction and contains a line normal to the deflection surface of the optical deflector, a light beam from the optical deflector is incident obliquely on a plane (a YZ plane) that is parallel to the main scanning direction and contains a line normal to the vertex of the curved mirror, and a conditional formula of 12.5<θM<17.5 is satisfied, where θM indicates an angle in degrees between the YZ plane and a central axis of a light beam traveling toward the curved mirror.

20. An optical scanner, comprising:
a light source unit for emitting a light beam;
an optical deflector for deflecting the light beam from the light source unit so as to cause scanning;
a first image formation optical system for forming a line image on a deflection surface of the optical deflector, disposed between the light source unit and the optical deflector; and a second image formation optical system composed of one curved mirror, disposed between the optical deflector and a surface to be scanned, a light beam from the first image formation optical system being incident obliquely on a plane that is parallel to a main scanning direction and contains a line normal to the deflection surface of the optical deflector, and a light beam from the optical deflector being incident obliquely on a plane (hereinafter referred to as a "YZ plane") that is parallel to the main scanning direction and contains a line normal to a vertex of the curved mirror, wherein the light source unit comprises two light sources, a light mixing member is provided for mixing light beams from the two light sources and is disposed between the light source unit and the optical deflector, and a conditional formula of 10<θM<35 is satisfied, where θM indicates an angle in degrees between the YZ plane and a central axis of a light beam traveling toward the curved mirror.

21. The optical scanner according to claim 20, wherein a light separating member for separating a light beam is provided between the optical deflector and the surface to be scanned.

22. The optical scanner according to claim 20, wherein the light beams emitted from the two light sources included in the light source unit have different wavelengths.

23. An image reader comprising an optical scanner according to claim 20.

24. An image forming apparatus comprising an optical scanner according to claim 20.

25. A color image forming apparatus, comprising:

a conveying member including a plurality of image forming units corresponding to a plurality of colors, the plurality of image forming units being assembled in a substantially cylindrical form, each of the plurality of image forming units including a developing unit and a photoconductor and being maintained to be arranged circumferentially in the substantially cylindrical form, the conveying member simultaneously rotating the plurality of image forming units around a central axis of the substantially cylindrical form to move each of the plurality of image forming units between an image formation position and a stand-by position;

a transfer member having a transfer body that can come into contact with the photoconductor of an image forming unit positioned at the image formation position, sequentially transferring each of toner images of the plurality of colors formed on each photoconductor onto the transfer body as the image forming unit at the image formation position is changed in turn, and superimposing the toner images of the plurality of colors to form a color toner image on the transfer body; and an optical scanner for exposing the photoconductor to light, wherein the optical scanner is an optical scanner according to claim 20.

* * * * *